United States Patent Office 2,875,258
Patented Feb. 24, 1959

2,875,258
CHEMICAL PROCESS

David Apotheker, Jefferson County, Ky., assignor to E. I. du Pont de Nemours and Company, Wilmington, Del., a corporation of Delaware No Drawing. Application December 7, 1956
Serial No. 626,812

4 Claims. (Cl. 260—678)

This invention relates to a process for the preparation of monovinylacetylene, and more particularly to a process in which acetylene is polymerized in an organic solvent under anhydrous conditions.

Monovinylacetylene, which is an intermediate in the manufacture of chloroprene (2-chlorobutadiene-1,3), is made by the polymerization of acetylene, usually employing cuprous chloride as the catalyst. In the usual aqueous systems the cuprous chloride is employed in the form of addition products with alkali metal, ammonium or certain substituted ammonium chlorides, all of which are dissolved in water to form the catalyst solution into which the acetylene to be polymerized is introduced. While it has been suggested that certain organic solvents be used in place of water, the previously suggested processes have not proved entirely satisfactory either from an economical standpoint or because of other difficulties involved in the processes.

When monovinylacetylene is prepared from acetylene using the aqueous solutions of cuprous chloride, potassium chloride and hydrogen chloride, several by-products are produced which originate from water and the hydrogen chloride. These by-products include acetaldehyde, methyl vinyl ketone, vinyl chloride and higher chlorine-containing compounds, all of which must be substantially completely removed from the monovinylacetylene since they have an undesirable effect even in minute amounts upon the subsequent polymerization of chloroprene which is made from such impure monovinylacetylene and also upon the properties of the resulting polychloroprene. Further difficulty has been experienced in the polymerization of acetylene in the aqueous catalyst, since tarry by-products are also formed which separate from the aqueous solutions upon the walls of the equipment which leads to plugging of the small orifices or other passages in the reactor such as more particularly described in U. S. Patent 2,759,985.

Although the aqueous catalyst has been employed in the manufacture of monovinylacetylene for a number of years, constant search has been made to improve this process so as to increase the amount of monovinylacetylene which could be made per hour per volume of catalyst, thereby reducing the amount of the catalyst and the size of reactor required for a given rate of production, and to decrease the ratio of divinylacetylene to monovinylacetylene formed in the reaction.

It is therefore an object of the present invention to provide a process for preparing monovinylacetylene with the formation of less by-products, and one which gives a greater volume of monovinylacetylene per volume of catalyst in any given time. It is a further object of the invention to provide a process whereby the ratio of monovinylacetylene to divinylacetylene formed is materially improved.

I have now found that monovinylacetylene may be produced at a higher rate of productivity per volume of catalyst employed and with the formation of less by-products, where the acetylene is passed into an anhydrous catalyst solution comprising cuprous chloride dissolved in a carboxylic acid amide in the presence of a hydrochloride of a primary or secondary non-aromatic amine while removing the monovinylacetylene and unchanged acetylene from the solution before not more than 10 mol percent of divinylacetylene is formed, the molecular ratio of the amine salt to the cuprous salt (as $Cu_2Cl_2$) being greater than 1:1 and preferably not greater than 2.3:1. Water should be carefully excluded from this system.

While the use of liquid carboxylic amides such as dimethyl formamide, has been suggested as a solvent in the manufacture of monovinylacetylene from acetylene where cuprous chloride is employed as the catalyst, it was necessary in the suggested process that the cuprous chloride be made soluble in the dimethyl formamide by the addition of ammonium chloride. Hydrogen chloride was also added to the solution as in the usual aqueous catalyst systems, but investigation of the use of this catalyst system indicated that relatively large amounts of hydrogen chloride were necessary to give a good conversion of monovinylacetylene, and that under the conditions vinyl chloride and chloroprene were formed in substantial quantities, and the activity of the catalyst was rapidly decreased with use.

According to the present invention, however, in which a primary or secondary amine hydrochloride is employed under anhydrous conditions, high productivity of monovinylacetylene is obtained without the addition of hydrogen chloride. In fact, if any substantial amount of hydrogen chloride is present in the system (such as 1% used in prior art aqueous catalysts), the productivity is rapidly decreased.

The amides used as solvents in the present invention may carry substituents on the nitrogen, and thus include cyclic amides (lactams) such as 2-pyrrolidone. One or both hydrogens of the amide nitrogen may also be replaced by simple hydrocarbon groups, such as methyl or butyl. Since the catalyst solution must of course be fluid at operating temperatures, the amides themselves must be low melting and should therefore ordinarily contain in all not more than 6 carbon atoms.

The primary and secondary amines in the form of the hydrochlorides are simple unsubstituted aliphatic monoamines containing not more than 6 carbon atoms, of which the following are illustrations: monomethylamine, dimethylamine, monoethylamine, dipropylamine, monobutylamine, and monohexylamine.

The following examples are given to illustrate the invention. Throughout this specification, the parts and percentages used are by weight unless otherwise specified.

*Example 1*

The catalyst solution is made by suspending 70 grams of dry dimethylamine hydrochloride in 140 grams of dry N,N-dimethyl formamide under nitrogen at 45° C. and then adding 150 grams of cuprous chloride which dissolves with the hydrochloride to form a clear solution, with the ratio of amine hydrochloride to $Cu_2Cl_2$ being 1.14:1. The reactor is a vertical glass tube 4.6 cm. in diameter with a capacity of 180 ml., surrounded by a jacket for heating and cooling. Acetylene is introduced at the bottom and passed through a perforated plate, which breaks up the gas into fine bubbles. The acetylene is dried before use by passing it through anhydrous calcium sulfate. The catalyst is maintained at 65° C. The acetylene is introduced at the rate of 330 ml. per minute. The gas leaving the top of the column, examined in an infrared spectrometer, contains 18 mol percent of monovinylacetylene and 1.5 mol percent of divinylacetylene, the rest being practically all acetylene. Acetaldehyde and vinyl chloride, if present at all, do not exceed 0.5%.

The catalyst productivity remains practically constant for 100 hours or more. After this period, productivity declines slowly. It is believed that traces of moisture in the acetylene feed causes the catalyst solvent dimethyl formamide (DMF) to hydrolize. Addition of $Cu_2Cl_2$, however, can restore the catalyst to its original productivity level.

During the reaction, a red precipitate has been observed. This is believed to be a complex containing dimethylamine, $C_2H_2$ and $Cu_2Cl_2$. This is dissolved and the catalyst activity maintained by the addition of just enough hydrogen chloride to dissolve the precipitate. A probable explanation is that the amine hydrochloride decomposes very slowly as the catalyst is used and a small amount of hydrogen chloride is removed from the system, and that the amine forms the precipitate. This loss of hydrogen chloride, if it occurs at all, is very much less than from the usual aqueous catalysts and the resulting formation of chlorine-containing by-products, if any, is very small. The addition of this small amount of hydrogen chloride to the catalyst after long operation is believed to regenerate the hydrochloride.

Although the catalyst gradually darkens on use, no solid tar, such as is formed in the aqueous catalyst, precipitates. Dilution of the used, dark catalyst with large amounts of 10% hydrochloric acid gives a negligible amount of tarry precipitate.

When 1% of water, based on the catalyst used in Example 1, is added, the monovinylacetylene falls to 8 mol percent.

When 0.35% of hydrogen chloride is added in Example 1, the monovinylacetylene falls to 9 mol percent.

When a conventional aqueous catalyst of optimum composition, containing potassium chloride and cuprous chloride (in a molar ratio of about 2:1) and hydrochloric acid is used in the same apparatus for comparison, the rate of production of monovinylacetylene is only about 25% as great as in Example 1.

*Example 2*

The apparatus and conditions of Example 1 are used except that only 100 grams of cuprous chloride and 41 grams of dimethylamine hydrochloride are dissolved in the 140 grams of dimethylformamide. The molar ratio of amine hydrochloride to cuprous chloride is thus 1:1. The gas leaving the top of the column contains 16% monovinylacetylene and 2% divinylacetylene, calculated on a molar basis.

*Example 3*

Example 1 is repeated, using 200 grams of cuprous chloride and 82 grams of dimethylamine hydrochloride. The exit gas contains 22% monovinylacetylene and 4.4% of divinylacetylene. Examples 2 and 3 show the effect of increasing the catalyst concentration.

*Example 4*

A catalyst is made from 150 grams of cuprous chloride, 91 grams of dry monoethylamine hydrochloride and 140 grams of dry dimethyl formamide as in Example 1, giving a molar ratio of hydrochloride to $Cu_2Cl_2$ of 1.47:1. This is used in the same apparatus, the other conditions being the same. The exit gas contains 9.7 mol percent of monovinylacetylene and 0.6 mol percent of divinylacetylene.

Similar results are obtained using as solvents in Example 1 (instead of dimethyl formamide), formamide, N,N-dimethylacetamide, 2-pyrrolidone, and N-methyl-2-pyrrolidone, and using monomethylamine hydrochloride as the hydrochloride. Other amides within the scope of the invention are acetamide, diethyl acetamide, propionamide, butyramide and 2-piperidone. On the other hand, many solvents which readily dissolve mixtures of cuprous chloride and amine hydrochlorides, such as acetonitrile, do not give active catalysts.

The preferred solvent for the present invention is dimethylformamide, and the preferred amine hydrochloride is dimethylamine hydrochloride.

The preferred ratios of amine hydrochloride to cuprous chloride are between 1:1 and 1.3:1. The catalyst solutions are preferably nearly saturated with the chlorides at the temperature of operation, although more dilute solutions may also be used as catalysts.

The manufacture of monovinylacetylene by means of these catalysts may be carried out either batchwise or continuously, the latter being preferred. In batch operation, the acetylene is dissolved in the catalyst and allowed to remain until the desired conversion has taken place. The reaction products are then removed along with unchanged acetylene by heating and/or reducing the pressure. Methods for continuous operation are described in the prior art — see U. S. Patent 1,876,857 and U. S. Patent 2,759,985.

The preferred operating temperatures are between 60° and 70° C. Temperatures between 30° and 100° C. may be employed, particularly the higher temperatures.

The acetylene feed used in the present invention may contain inert gases and in fact may be a dilute acetylene such as is formed by the pyrolysis or partial combustion of hydrocarbons, rather than the 100% acetylene. The nitrogen, carbon dioxide, ethylene, etc., present in these gaseous reaction products do not interfere with action of the catalyst upon the acetylene, although obviously oxygen, hydrogen sulfide and mercaptans should be first removed, if present in significant amounts, because of their reaction with the cuprous chloride.

As illustrated in Example 1, the addition of very small amounts of hydrogen chloride to regenerate the amine hydrochloride is desirable where the reaction is carried out for a prolonged period of time using the same catalyst. Not more than 0.1% of acid should be added at any one time.

I claim:

1. A process for the manufacture of monovinylacetylene by the polymerization of acetylene, which comprises passing the acetylene into a substantially anhydrous solution of cuprous chloride in an organic carboxylic acid amide containing the hydrochloride of an unsubstituted aliphatic monoamine of the group consisting of primary and secondary monoamines of not more than 6 carbon atoms, while excluding water from the system, the temperature of the solution being maintained at from 30° to 100° C., the ratio of the amine salt to the cuprous salt being from 1:1 to 2.3:1, and removing the monovinylacetylene and unchanged acetylene when not more than 10 mol percent of divinylacetylene is formed.

2. A process for the manufacture of monovinylacetylene by the polymerization of acetylene, which comprises passing the acetylene into a substantially anhydrous solution of cuprous chloride in dimethyl formamide containing the hydrochloride of an unsubstituted aliphatic monoamine of the group consisting of primary and secondary monoamines of not more than 6 carbon atoms, while excluding water from the system, the temperature of the solution being maintained at from 30° to 100° C., the ratio of the amine salt to the cuprous salt being from 1:1 to 1.3:1, and removing the monovinylacetylene and unchanged acetylene when not more than 10 mol percent of divinylacetylene is formed.

3. A process for the manufacture of monovinylacetylene by the polymerization of acetylene, which comprises passing the acetylene into a substantially anhydrous solution of cuprous chloride in dimethyl formamide containing dimethylamine hydrochloride, while excluding water from the system, the temperature of the solution being maintained at from 60° to 70° C., the ratio of the amine salt to the cuprous salt being from 1:1 to 1.3:1, and removing the monovinylacetylene and unchanged acetylene when not more than 10 mol percent of divinylacetylene is formed.

4. A process for the manufacture of monovinylacetylene by the polymerization of acetylene, which comprises passing the acetylene into a substantially anhydrous solution of cuprous chloride in dimethyl formamide containing monomethylamine hydrochloride while excluding water from the system, the temperature of the solution being maintained at from 60° to 70° C., the ratio of the amine salt to the cuprous salt being from 1:1 to 1.3:1, and removing the monovinylacetylene and unchanged acetylene when not more than 10 mol percent of divinylacetylene is formed.

References Cited in the file of this patent

UNITED STATES PATENTS

| | | |
|---|---|---|
| 1,926,039 | Downing et al. | Sept. 12, 1933 |
| 1,926,055 | Nieuwland et al. | Sept. 12, 1933 |
| 2,146,448 | Scott et al. | Feb. 7, 1939 |
| 2,161,645 | Vollman et al. | June 6, 1939 |